United States Patent
Lee et al.

(10) Patent No.: US 10,200,437 B2
(45) Date of Patent: Feb. 5, 2019

(54) DEVICE AND METHOD FOR STREAMING SERVICE

(71) Applicants: Samsung Electronics Co., Ltd., Gyeonggi-do (KR); UNIST (ULSAN NATIONAL INSTITUTE OF SCIENCE AND TECHNOLOGY), Ulsan (KR)

(72) Inventors: Joohyung Lee, Gyeonggi-do (KR); Kyunghan Lee, Ulsan (KR); Kisuk Kweon, Gyeonggi-do (KR); Jung Shin Park, Seoul (KR); Jicheol Lee, Gyeonggi-do (KR); Jinsung Lee, Gyeonggi-do (KR); Hyungho Lee, Seoul (KR); Hanna Lim, Gyeonggi-do (KR)

(73) Assignees: Samsung Electronics Co., Ltd., Suwon-si (KR); UNIST (Ulsan National Institute of Science and Technology), Ulsan (KR)

( * ) Notice: Subject to any disclaimer, the term of this patent is extended or adjusted under 35 U.S.C. 154(b) by 98 days.

(21) Appl. No.: 15/379,344

(22) Filed: Dec. 14, 2016

(65) Prior Publication Data
US 2017/0171284 A1    Jun. 15, 2017

(30) Foreign Application Priority Data
Dec. 14, 2015   (KR) ........................ 10-2015-0178433

(51) Int. Cl.
*H04L 12/26*    (2006.01)
*H04L 29/06*    (2006.01)
(Continued)

(52) U.S. Cl.
CPC .......... *H04L 65/80* (2013.01); *H04L 43/0864* (2013.01); *H04L 43/0894* (2013.01);
(Continued)

(58) Field of Classification Search
CPC . H04L 43/0864; H04L 43/0894; H04L 47/27; H04L 65/4069; H04L 65/602; H04L 65/80; H04W 84/042
See application file for complete search history.

(56) References Cited

U.S. PATENT DOCUMENTS 7,295,520 B2   11/2007  Lee et al.
8,621,044 B2 * 12/2013  Sood ................... H04L 65/4092
                                                   709/217
(Continued)

OTHER PUBLICATIONS

Szigeti, Tim, et al., "Quality of Service Design Overview," 2016, 2 pages, publisher Pearson Education, Cisco Press, Indianapolis, IN, available at http://www.ciscopress.com/articles/.
(Continued)

*Primary Examiner* — Minh Trang T Nguyen

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An electronic device for providing a streaming service includes a controller, an encoder operatively coupled with the controller, and a transmitter operatively coupled with the control unit, wherein the controller is configured to provide a network available bandwidth estimated in a transmission layer of the electronic device from the transmission layer to an application layer, generate stream data from initial data based on the network available bandwidth, and transmit the stream data to another electronic device.

20 Claims, 15 Drawing Sheets

(51) Int. Cl.
    *H04L 12/807*     (2013.01)
    *H04W 84/04*     (2009.01)
    *H04L 12/811*     (2013.01)
    *H04L 12/927*     (2013.01)
    *H04L 12/841*     (2013.01)

(52) U.S. Cl.
    CPC .......... *H04L 47/27* (2013.01); *H04L 65/4069* (2013.01); *H04L 65/602* (2013.01); H04L 47/283 (2013.01); H04L 47/38 (2013.01); H04L 47/803 (2013.01); H04W 84/042 (2013.01)

(56) References Cited

U.S. PATENT DOCUMENTS

| | | | | |
|---|---|---|---|---|
| 8,745,209 B2 * | 6/2014 | Lloyd | ...................... | H04L 69/04 370/229 |
| 8,837,586 B2 * | 9/2014 | Begen | .............. | H04N 21/23424 375/240.12 |
| 2008/0195745 A1 * | 8/2008 | Bowra | .............. | H04L 29/06027 709/231 |
| 2010/0040347 A1 * | 2/2010 | Kent, Jr. | ................. | H04N 5/775 386/353 |
| 2010/0121974 A1 * | 5/2010 | Einarsson | ................ | H04L 47/10 709/231 |
| 2012/0128002 A1 * | 5/2012 | Muramoto | ............ | H04L 1/0002 370/392 |
| 2013/0114421 A1 * | 5/2013 | Qian | ................... | H04L 43/0829 370/252 |
| 2016/0337426 A1 * | 11/2016 | Shribman | ........... | H04L 65/4084 |
| 2017/0078676 A1 * | 3/2017 | Coward | .............. | H04N 19/172 |

OTHER PUBLICATIONS

"QoS (Quality of Service)," A reference guide to all things VOIP, 2003-2016, 9 pages, publisher VOIP-Info.org LLC, available at http://www.voip-info.org/wiki/view/QoS.

* cited by examiner

DEVICE AND METHOD FOR STREAMING SERVICE

CROSS-REFERENCE TO RELATED APPLICATIONS AND CLAIM OF PRIORITY

The present application is related to and claims the priority under 35 U.S.C. § 119(a) to Korean Application Serial No. 10-2015-0178433, which was filed in the Korean Intellectual Property Office on Dec. 14, 2015, the entire content of which is hereby incorporated by reference.

TECHNICAL FIELD

The present disclosure generally relates to a streaming service and, more particularly, to a method and device for providing a low-latency service and a low-jitter streaming service.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the development of media, users can use various types of contents. In addition, with the development of a communication technology, users can use electronic devices having various communication functions. As a result, there is an increasing demand from users for a service to transmit acquired contents in real time.

SUMMARY

Based on the discussion described above, the present disclosure provides a method and device for providing a low-latency service and a low-jitter service by reducing latency and a jitter that occur when an electronic device transmits and receives data.

According to various embodiments of the present disclosure, an operation method of an electronic device for providing a streaming service may include providing a network available bandwidth estimated in a transmission layer of the electronic device, from the transmission layer to an application layer, generating stream data from initial data based on the network available bandwidth, and transmitting the stream data to another electronic device.

According to various embodiments of the present disclosure, an operation method of an electronic device for receiving a streaming service may include receiving stream data from another electronic device; and generating reproduction data by decoding the stream data, wherein the stream data is generated based on a network available bandwidth, the network available bandwidth is provided from a transmission layer of the other electronic device to an application layer of the other electronic device, and the network available bandwidth is estimated in the transmission layer of the other electronic device.

According to various embodiments of the present disclosure, an electronic device for providing a streaming service may include a control unit, an encoder operatively coupled with the control unit; and a transmitter operatively coupled with the control unit, wherein the control unit is configured to: provide a network available bandwidth estimated in a transmission layer of the electronic device, from the transmission layer to an application layer; generate stream data from initial data based on the network available bandwidth; and transmit the stream data to another electronic device.

According to various embodiments of the present disclosure, an electronic device for receiving a streaming service may include a control unit, a decoder operatively coupled with the control unit; and a receiver operatively coupled with the control unit, wherein the control unit is configured to receive stream data from another electronic device and decode the stream data so as to generate reproduction data, the stream data is generated based on a network available bandwidth; the network available bandwidth is provided from a transmission layer of the other electronic device to an application layer of the other electronic device, and the network available bandwidth is estimated in the transmission layer of the other electronic device.

A device and method according to various embodiments of the present disclosure can reduce latency caused by encoding or decoding so as to provide an efficient streaming service to another electronic device.

According to various embodiments of the present disclosure, an efficient streaming service can be provided to another electronic device by reducing latency caused by content transmission.

Effects which can be acquired in the present disclosure are not limited to the above described effects, and other effects that have not been mentioned may be clearly understood by those skilled in the art to which the present disclosure belongs, from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
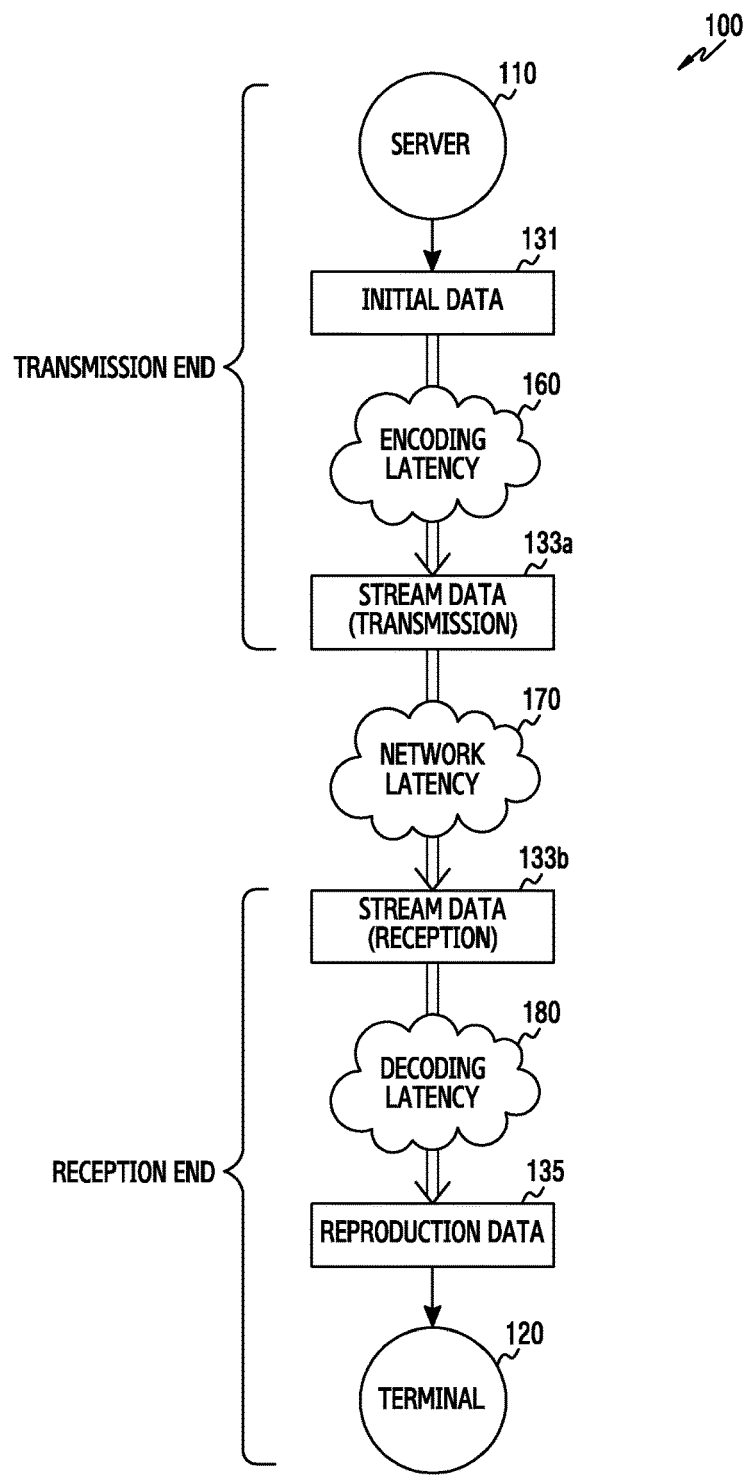
FIG. 1 illustrates latency caused in accordance with transmission and reproduction of streaming.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the operational principle of various embodiments of the present disclosure will be described in detail with reference to the accompanying drawings. In describing various embodiments below, a detailed description of related known configurations or functions incorporated herein will be omitted when it is determined that the detailed description thereof may unnecessarily obscure the subject matter of the present disclosure. Terms described below are defined in consideration of functions in various embodiments, but may vary according to the intention or convention of a terminal or operator. Therefore, the definitions of the terms should be made based on the contents throughout the specification.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted as having ideal or excessively formal meanings unless clearly defined in the present disclosure. In some cases, even the term defined in the present disclosure should not be interpreted to exclude embodiments of the present disclosure.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

The terms used in the description below, such as terms for indicating: control information, a multi-antenna signal processing scheme, a state change (e.g., a change in a network state, and an event), a transmission signal, network entities, messages (e.g., a request), elements of a device, etc. are examples provided for the convenience of explanation. Therefore, the present disclosure is not limited by the terms described hereinafter, and terms having equivalent technical meanings may be used.

A conventional multimedia system may be divided into a system that downloads a content and then reproduces the content, and a system that transmits a content through streaming in real time. The present disclosure relates to a system configured to transmit, by a service provider, a content to a user through streaming in real time.

A service using a scheme for transmitting a content through streaming in real time may be required to provide the content to a user without disconnection until the service is completed. Particularly, a service based on bidirectional streaming (e.g., interactive streaming) may be required to be able to immediately response to a content transmitted by a counterpart and feedback, to the counterpart, data according to the content. Therefore, it is important to consider a latency time between a transmission end and a reception end. A latency time allowed by interactive streaming is known to be up to 150 (ms) for one-way streaming or up to 250 (ms) for interactive streaming. However, an interactive latency time of less than 100 (ms) may be needed to obtain an effect similar to that of interaction in the field. In order to reduce a latency time in a streaming service, it may be required to consider an operation of a streaming technique first.

In a general streaming technique, a server estimates the current network speed using a speed at which a transmission control protocol (TCP) socket requests data. The server provides a streaming service based on the estimated network speed. Here, an estimated value of the network speed may include buffer latency in the socket. In other words, the estimated value of the network speed is different from an actual network speed. Therefore, there is difficulty in using the technique in an ultra low-latency streaming system.

As a terminal moves or the level of network congestion changes rapidly, the network speed may change continuously. When the server is unable to accurately recognize a state of the network, there may occur a problem of transmitting high quality streaming data using a slow network or transmitting low quality streaming data using a fast network. When the server transmits a low quality image compared to the network speed, no serious problem occurs in terms of the latency performance of the image, sensed by the terminal. However, in the opposite case, a serious skip phenomenon may occur. Here, the skip phenomenon refers to a phenomenon in which buffering occurs in the current frame and then a significant number of subsequent frames are displayed.

In a conventional streaming technique, a server may not be able to control a change in a network state. That is, the server may not estimate an accurate network available bandwidth. In the conventional streaming technique, the server has maintained a streaming quality corresponding to a value lower than an actual network available bandwidth value, to provide a content. However, the present disclosure describes a method by which a server accurately estimates a network available bandwidth value so as to improve the quality of streaming up to a level in which almost 100% of a network available bandwidth is utilized. In addition, in the present disclosure, the configuration of a low-latency and low-jitter streaming system is described through adjusting the number of frames when encoding is performed, using the concept of a Network-aware Equal-time Stream (NEqS). Devices and methods according to various embodiments of the present disclosure enable almost no jitter to occur so as to eliminate a streaming quality degradation problem such as skipping. Through the adjustment, it may be possible to secure a lowest streaming latency performance corresponding to the next generation communication system such as 5th Generation (5G) and 6th Generation (6G).

FIG. 1 illustrates latency caused in accordance with transmission and reproduction of streaming.

Referring to FIG. 1, a server 110 may encode initial data 131. The initial data 131 may be raw data which is not processed. The initial data 131 may be raw data including a content. When the server 110 performs encoding, encoding latency 160 may occur. The encoding latency 160 may be latency caused by calculation of an encoder. As an encoding rate increases, an operation time of an encoding unit may increase.

The server 110 may generate stream data 133A by encoding the initial data 131. The stream data 133A may be data for streaming transmission. The stream data 133A may include the content. The server 110 may transmit the stream data 133A to a terminal 120. When the server 110 transmits the stream data 133A to the terminal 120, network latency 170 according to transmission of the stream data 133A may occur. The terminal 120 may receive stream data 133B from the server 110. The stream data 133B may correspond to the stream data 133A. The terminal 120 may decode the stream data 133B. When the terminal 120 decodes the stream data 133B, decoding latency 180 may occur at a reception end. When encoding is performed using a high encoding rate, time consumed in a decoder may be further increased. The terminal 120 may decode the stream data 133B to generate reproduction data 135. The terminal 120 may reproduce the reproduction data 135.

As described above, various latencies may occur in a procedure for providing, by the server 110, the content to the terminal 120. For example, the encoding latency 160 may occur in a procedure for encoding the content at a transmission end. For another example, the network latency 170 may occur in a procedure for transmitting the content from the transmission end to the reception end. For still another example, the decoding latency 180 may occur in a procedure for decoding the content at the reception end. A method for adaptively changing an encoding rate may be considered as a solution for reducing the encoding latency 160. A method for more accurately estimating a change in a network state may be considered as a solution for reducing the network latency 170.

The server 110 may be required to accurately estimate a network state in order to seamlessly receive the content. The network state may include a network transmission rate or a network available bandwidth. The relationship between the network transmission rate and the network available bandwidth is as following [EQUATION 1]:

$$C=W \log 2(1+SNR) \qquad \text{[EQUATION 1]}$$

where C indicates a network transmission rate, W indicates a network available bandwidth, and SNR indicates a signal-to-noise ratio. In consideration of [EQUATION 1], the server 110 may measure the transmission rate of the network in order to estimate the network available bandwidth.

The server 110 may be required to perform encoding to a small size when an estimated network available bandwidth value is small. The server 110 may perform encoding to the sufficiently large size of data when a network available bandwidth value is large. That is, the server 110 may provide a content to the terminal 120, by applying a different encoding rate according to an estimated network available bandwidth value. Therefore, the server 110 may be required to estimate an accurate network available bandwidth value in order to more accurately determine a change and accurately control latency occurring in the network. The server 110 may be required to accurately measure a network speed in order to estimate a more accurate network available bandwidth.

Figure 2:
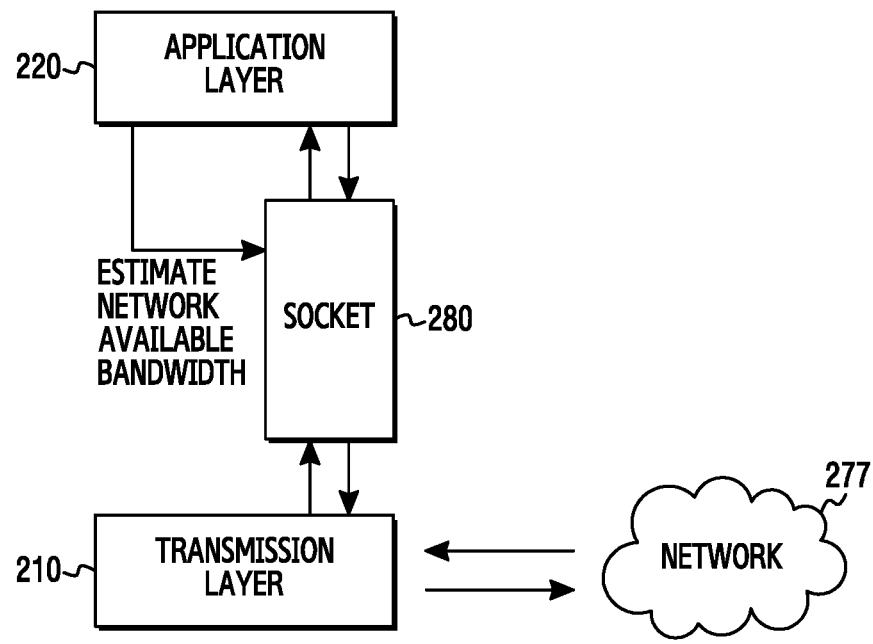
FIG. 2 illustrates a control device configured to estimate a network available bandwidth.

FIG. 2 illustrates a control device configured to estimate a network available bandwidth.

Referring to FIG. 2, the control device 200 may communicate with a network 277 in a transmission layer 210. The control device 200 may transmit data to the network 277 through a socket 280. The data may be data according to a request of the network 277.

The control device 200 may receive a request associated with the data from the network 277 through the socket 280. The received request associated with the data may be provided to an application layer 220 through the socket 280. The control device 200 may measure the transmission rate of the request associated with the data of the socket 280 in the application layer 220. The application layer 220 may estimate a network available bandwidth based on the measured transmission rate.

The network available bandwidth may be a bandwidth that enables communication in the network 277. Since a network available bandwidth estimated by the control device 200 does not consider latency occurring in the socket 280, the estimated network available bandwidth may be different from an actual network available bandwidth. The control device 200 may have difficulty in estimating an accurate network state.

Figure 3:
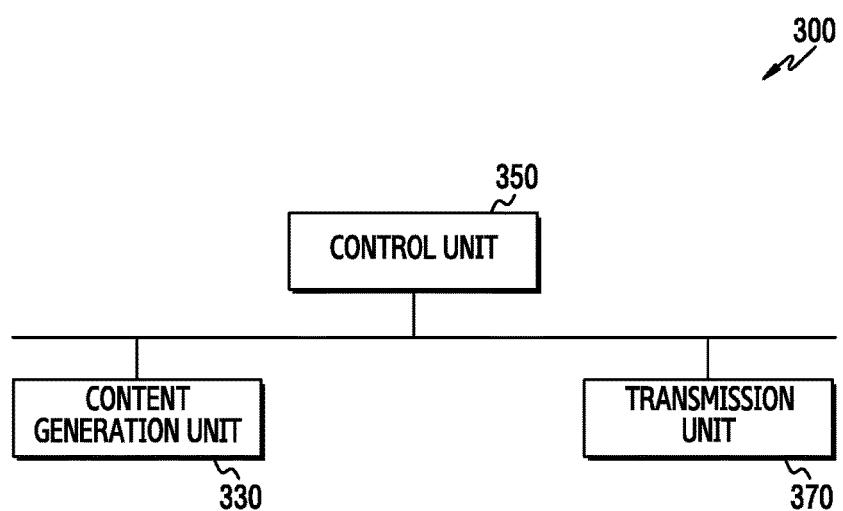
FIG. 3 illustrates a functional block configuration of an electronic device according to various embodiments.

FIG. 3 illustrates a functional block configuration of an electronic device according to various embodiments.

Referring to FIG. 3, an electronic device 300 may include a content generation unit 330, a control unit 350, and a transmission unit 370. The content generation unit 330 may be operatively coupled with the control unit 350. The transmission unit 370 may be operatively coupled with the control unit 350.

The content generation unit 330 may generate a content. The content may correspond to a concept including various kinds of contents. For example, the content may be a video content. For another example, the content may be a voice content. For still another example, the content may be a content including smell or touch.

The content generation unit 330 may generate initial data from the generated content. Unlike an example illustrated in FIG. 3, the content generation unit 330 may include individual hardware physically separated from the electronic device 300.

The control unit 350 may estimate a network available bandwidth value in a transmission layer of the electronic device 300. The control unit 350 may measure time taken for a round-trip of a packet from the electronic device to another electronic device. The control unit 350 may calculate the amount of packets transmitted during the measured time. The control unit 350 may estimate the network available bandwidth value based on the measured time and the amount of the transmitted packets.

The control unit 350 may estimate a network available bandwidth using a value of a congestion window. The value of the congestion window may be determined based on a transmission protocol of the transmission layer. The control unit 350 may estimate the network available bandwidth value based on the measured time and the value of the congestion window.

An application layer of the control unit 350 may be provided with the network available bandwidth from the transmission layer. The control unit 350 may use an application for receiving the network available bandwidth value, in the application layer. The control unit 350 may use a transmission protocol for estimating the network available bandwidth value, in the transmission layer. For example, the control unit 350 may receive the network available bandwidth using a system call. The system call may be predefined in the transmission protocol. The control unit 350 may control the application to use the system call.

The control unit 350 may calculate an encoding rate based on the network available bandwidth. The control unit 350 may transmit the encoding rate to the content generation unit 330. For example, when the estimated network available bandwidth value is small, the control unit 350 may increase the current encoding rate to a value higher than a previous encoding rate. The increased encoding rate may be transmitted to the content generation unit 330. The content generation unit 330 may adjust the size of a content to be generated, according to the increased encoding rate. That is, the control unit 350 may adjust the quality of the content, and intervals between the frames of the content.

The control unit 350 may encode the initial data in consideration of the estimated network available bandwidth. The control unit 350 may encode the initial data to a size capable of transmitting N frames within a specific time. The control unit 350 may determine the specific time based on the network available bandwidth. The control unit 350 may encode the initial data using at least one of a Central Processing Unit (CPU) and a Graphic Processing Unit (GPU). The control unit 350 may generate stream data from the encoded data.

The transmission unit 370 may receive the stream data transmitted from the control unit 350. The transmission unit 370 may transmit the stream data to another device through a network. The network may be a wireless network or a wired network. The transmission unit 370 may perform a conversion function between a radio frequency (RF) signal and a baseband signal according to the physical layer standard for a system. When data is transmitted in a wireless network, the transmission unit 370 transmits an RF signal through at least one antenna, processes the RF signal, and up-converts the RF signal into a baseband signal, and converts the baseband signal into a digital signal. For example, the transmission unit 370 may include a transmission filter, an amplifier, a mixer, an oscillator, a digital-to-analog convertor (DAC), an analog-to-digital convertor (ADC), and so on. When a plurality of transmission antennas are provided, the transmission unit 370 may include a plurality of RF chains.

Figure 4:
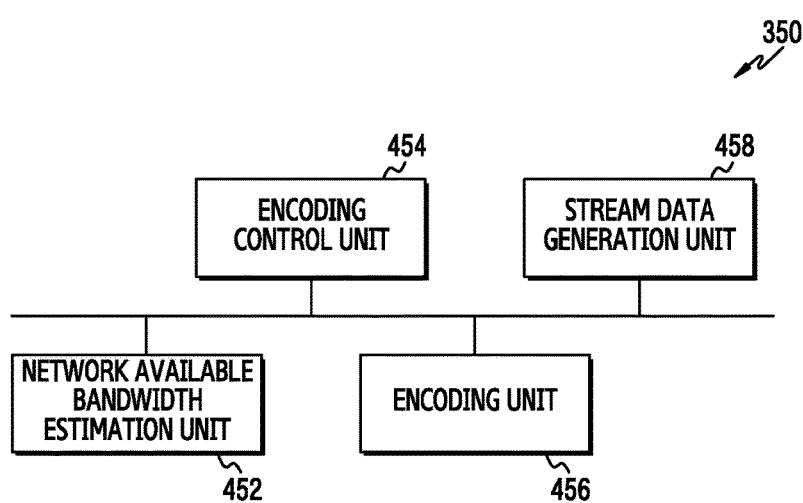
FIG. 4 illustrates a functional block configuration of a control unit according to various embodiments.

FIG. 4 illustrates a functional block configuration of a control unit according to various embodiments. The block configuration may be included in the control unit 350 illustrated in FIG. 3.

Referring to FIG. 4, the control unit 350 may include a network available bandwidth estimation unit 452, an encoding control unit 454, an encoding unit 456, and a stream data generation unit 458.

The network available bandwidth estimation unit 452 may estimate the network available bandwidth value in the transmission layer of the electronic device 300. The network available bandwidth estimation unit 452 may measure a network transmission rate in order to estimate the network available bandwidth value. The network available bandwidth estimation unit 452 may estimate the network transmission rate in the transmission layer. The transmission layer may include a transmission protocol. The transmission protocol may include a transport layer protocol (TCP) or a user datagram protocol (UDP). The network available bandwidth estimation unit 452 may estimate the network available bandwidth by utilizing a transmission window value calculated by the transmission protocol. In some embodiments, the network available bandwidth estimation unit 452 may insert a transmission rate estimation module into a transmission protocol (for example, TCP or UDP) in order to estimate the network available bandwidth in the transmission layer that is not the application layer. The network available bandwidth estimation unit 452 may estimate the network available bandwidth through the transmission rate estimation module in the transmission layer.

The network available bandwidth estimation unit 452 may measure time taken for a round-trip of a packet from the electronic device 300 to another electronic device. The network available bandwidth estimation unit 452 may measure an interval between a time point when the packet is transmitted to another electronic device and a time point when an acknowledgement response message (acknowledgement, ACK) is received from another electronic device in response to the packet. The interval may be the measured time. The measured time may be a round-trip time (RTT).

The network available bandwidth estimation unit 452 may calculate the amount of packets transmitted during the time. When a network state is relatively poor and therefore packet loss occurs, the amount of packets transmitted to another electronic device during the time may be reduced. The network available bandwidth estimation unit 452 may calculate the amount of the packets again, in consideration of the amount of the lost packets. The network available bandwidth estimation unit 452 may calculate the amount of the packets again, using a retransmission algorithm.

The network available bandwidth estimation unit 452 may estimate the network available bandwidth value based on the measured time and the amount of the transmitted packets.

The network available bandwidth estimation unit 452 may estimate the network available bandwidth value by dividing the amount of the transmitted packets by the measured time.

The network available bandwidth estimation unit 452 may calculate a value of a congestion window corresponding to the time. The congestion window may mean a window value in a congestion control algorithm. Congestion may mean a phenomenon in which the number of packets waiting in a network exceeds the processing capacity of the network. That is, the congestion phenomenon may mean a phenomenon in which a queue in the network reaches a saturation state and packet transmission is thus canceled. The congestion control algorithm may be a technique to prevent or control the congestion in advance, by reducing the number of packets waiting in the network. The congestion control algorithm may use the congestion window. The congestion window may be increased in various schemes until the state of the network is saturated. Such schemes may vary according to a transmission protocol. For example, the transmission protocol may be TCP RENO. For another example, the transmission protocol may be TCP TAHO.

The network available bandwidth estimation unit 452 may estimate the network available bandwidth value based on the measured time and the calculated value of congestion window. The network available bandwidth estimation unit 452 may estimate the network available bandwidth value by dividing the calculated value of congestion window by the measured time. When there is little or no packet loss, or when there are not enough packets to transmit, it may be more useful for the network available bandwidth estimation unit 452 to use a scheme for using the congestion window than a scheme for calculating the amount of the packets.

The transmission protocol may be implemented by a kernel. The kernel may be a Linux kernel provided under a Linux operating system. The kernel may control hardware in order to estimate the network available bandwidth. The hardware may estimate the network available bandwidth. The kernel may perform a function to control the hardware, instead of an application executed in the application layer in the electronic device 300. The kernel may be a program operating in response to the execution of the application. A request may require the estimated network available bandwidth value. The request may be a system call requesting the estimated network available bandwidth value.

The encoding control unit 454 may be included in an application layer (for example, the application layer 220 illustrated in FIG. 2).

The encoding control unit 454 may receive the network available bandwidth value from the network available bandwidth estimation unit 452. The encoding control unit 454 may reduce an unnecessary latency time (for example, a latency time caused by a socket) by receiving the network available bandwidth value from the network available bandwidth estimation unit 452 without going through a socket (for example, the socket 280 illustrated in FIG. 2). For example, the encoding control unit 454 may receive the network available bandwidth value estimated in the transmission protocol, using a system call. The transmission protocol may be linked with the socket generated in the application layer. In order to use the system call, the electronic device 300 may modify the kernel so as to recompile the same.

The encoding control unit 454 may predefine the system call. The system call may not be a system call provided by a system call interface of the kernel. Therefore, the encoding control unit 454 may modify and recompile the kernel. All system calls may have respective unique numbers. The system call interface may have a system call table that manages numbers of the all system calls. The encoding control unit 454 may receive the number of the system call, allocated thereto. The encoding control unit 454 may register the allocated number in the system call table. The encoding control unit 454 may implement a function of the system call, and then compile the same to the kernel. That is, the encoding control unit 454 may update the system call interface.

The encoding control unit 454 may use the predefined system call. The encoding control unit 454 may control an application in order to use the system call. The encoding control unit 454 may control the application to estimate the network available bandwidth, using the predefined system call. The encoding control unit 454 may execute the system call through the application. When the system call is executed, the encoding control unit 454 may receive an estimated value of the network available bandwidth from the transmission protocol. The encoding control unit 454 may acquire a network available bandwidth value without latency caused by socket buffer, by receiving the estimated value.

The encoding control unit 454 may calculate an encoding rate based on the network available bandwidth. When the network available bandwidth value is large, the encoding control unit 454 may apply a low encoding rate. In contrary, when the network available bandwidth value is small, the encoding unit 454 may apply a high encoding rate. The encoding unit 454 may transmit a command to the encoding unit 456 to apply a desired encoding rate. In addition, the encoding unit 454 may transmit the encoding rate to the content generation unit 330 in FIG. 3. The content generation unit may generate a content based on the encoding rate. The encoding control unit 454 may determine the quality of the content and intervals between frames of the content. The encoding control unit 454 may generate raw data using the content generation unit 330. The raw data may mean unprocessed data.

The encoding control unit 454 may control the encoding unit 456 to perform encoding using a specific encoding rate. The encoding control unit 454 may transmit a command to the content generation unit 330 in FIG. 3 to perform encoding with a group of picture (GOP) structure of a specific form. The GOP may conform to the standard defined by Moving Picture Expert Group (MPEG). According to the above standard, the GOP may have three kinds of frames. The GOP may have a combination of an I-frame, a P-frame, and/or a B-frame. For example, the GOP may have a repetition of "I B . . . B P B . . . B P". For another example, the GOP may have a repetition of "I P . . . P". The three kinds of frames may be an Intra-coded frame (I-frame), a Predicted frame (P-frame), a Bi-predictive frame (B-frame). The I-frame may be an independent frame. The P-frame may be a frame related to the I-frame. For example, the P-frame may be generated based on an I-frame positioned before the P-frame. The B-frame may be a frame related to at least one of the I-frame, P-frame, and B-frame. For example, the B-frame may be generated based on an I-frame, P-frame, or B-frame positioned before the B-frame, and an I-frame, P-frame, or B-frame position after the B-frame. The B-frame may improve a compression rate of an image, but it may delay an encoding time due to a trade-off with respect thereto. In order to reduce latency of an encoding time, the encoding control unit 454 may determine compression efficiency and encoding latency such that encoded data has an I-frame and/or a P-frame. Therefore, the encoding control unit 454 needs to select an appropriate ratio of an I-frame to a P-frame ratio. The ratio may be determined proactively.

Alternatively, the encoding control unit 454 may adaptively determine the ratio according to the encoding rate. The encoding control unit 454 may increase the proportion of the I-frame so as to increase continuity.

The encoding control unit 454 may transmit, to the encoding unit 456, a GOP structure configured in units of N frames so that encoding is performed in units of N frames. The N may be a natural number. The encoding control unit 454 may determine the N based on the GOP structure. The encoding control unit 454 may enable the encoding unit 456 to encode the N frames to a size transmittable within a specific time. Stream data for the N frames may be referred to as Network-aware Equal-time Stream (NEqS). Since the NEqS is stream data for N frames captured at equal intervals, the NEqS may be data that guarantees a reproduction time corresponding to the N frames. When the quality of the stream data corresponding to the NEqS needs be particularly high or particularly low, the encoding control unit 454 may transmit a command to a multimedia capture device to instruct to increase or decrease the quality of the capture. When high quality data is encoded at a low quality or low quality data is encoded at a high quality, the encoding control unit 454 may previously block inefficiencies for encoding and an encoding time.

The encoding control unit 454 may determine the specific time based on the network available bandwidth. The specific time may include a network latency time and an encoding latency time. For example, the specific time may be time between a time point when content transmission is determined and a time point when another electronic device receives an NEqS corresponding to the content. The electronic device 300 may start encoding at a time point determined to transmit data corresponding to the NEqS to another electronic device. When the NEqS is generated through the encoding, the electronic device 300 may transmit the generated NEqS to the another electronic device.

The encoding unit 456 may encode the initial data. The encoding unit 456 may acquire the initial data from an embedded memory. The encoding unit 456 may acquire the initial data from the content generation unit 330. The encoding unit 456 may transmit the encoded data to the stream data generation unit 458.

The encoding unit 456 may encode the initial data using a central processing unit (CPU). The CPU may have an arithmetic and logic unit (ALU). The encoding unit 456 may encode the initial data using the arithmetic and logic unit. The CPU may be a dual-core having two cores, a quad-core having four cores, a hexa-core having six cores, and an octa-core having eight cores. The CPU may have a plurality of cores. As the number of the cores increases, the number of the arithmetic and logic units also increases, and performance of the CPU may thus be improved. As the number of cores increases, there is an advantage in performing multi-tasking or multi-calculation operations. Since encoding is performed by multi-calculations in small units, the encoding unit 456 may require a CPU having a plurality of cores.

The encoding unit 456 may encode the initial data using a graphic processing unit (GPU). A GPU, in general, may have more arithmetic and logic units than a CPU. A GPU, in general, may have more cores than a CPU. For example, a CPU may have two, four, eight, and sixteen cores, while a GPU may have hundreds of cores. Therefore, a GPU may have better performance than a CPU in performing multi-calculations. Since encoding is not necessarily a complicated calculation requiring a CPU as well as includes multi-calculations in small units, the encoding unit 456 may need a GPU. In addition, during an encoding operation, a CPU may show better performance than a GPU in relation to some calculations. For example, when an NEqS according to various embodiments of the present disclosure is generated, calculations for generating the NEqS may be generally performed, in addition to simple encoding. Therefore, the encoding unit 456 may attempt to reduce an encoding latency time through collaboration between the CPU and the GPU.

The stream data generation unit 458 may receive encoded data from the encoding unit 456. The stream data generation unit 458 may generate stream data from the encoded data. When a stream starts to be generated as a result of the encoding, the stream data generation unit 458 may control a transmission rate by controlling a flow of the stream data. The stream data generation unit 458 may transmit the stream data to the transmission unit 370 in FIG. 3.

The transmission unit 370 may transmit the stream data through a transmission protocol, using a socket. The electronic device 300 may control the amount of stream data transmitted to the socked and a time when the stream data is transmitted, so as to control a speed at which the stream data is transmitted to the socket. The transmission unit 370 may transmit the generated stream data to another electronic device through the transmission protocol. The another electronic device may decode the stream data as soon as the stream data is received. As described above, when a B-frame is used, the B-frame is unable to be decoded before a P-frame, which comes after the B-frame, is received and additional latency thus occurs. Therefore, another electronic device may use an I-frame and a P-frame.

Figure 5:
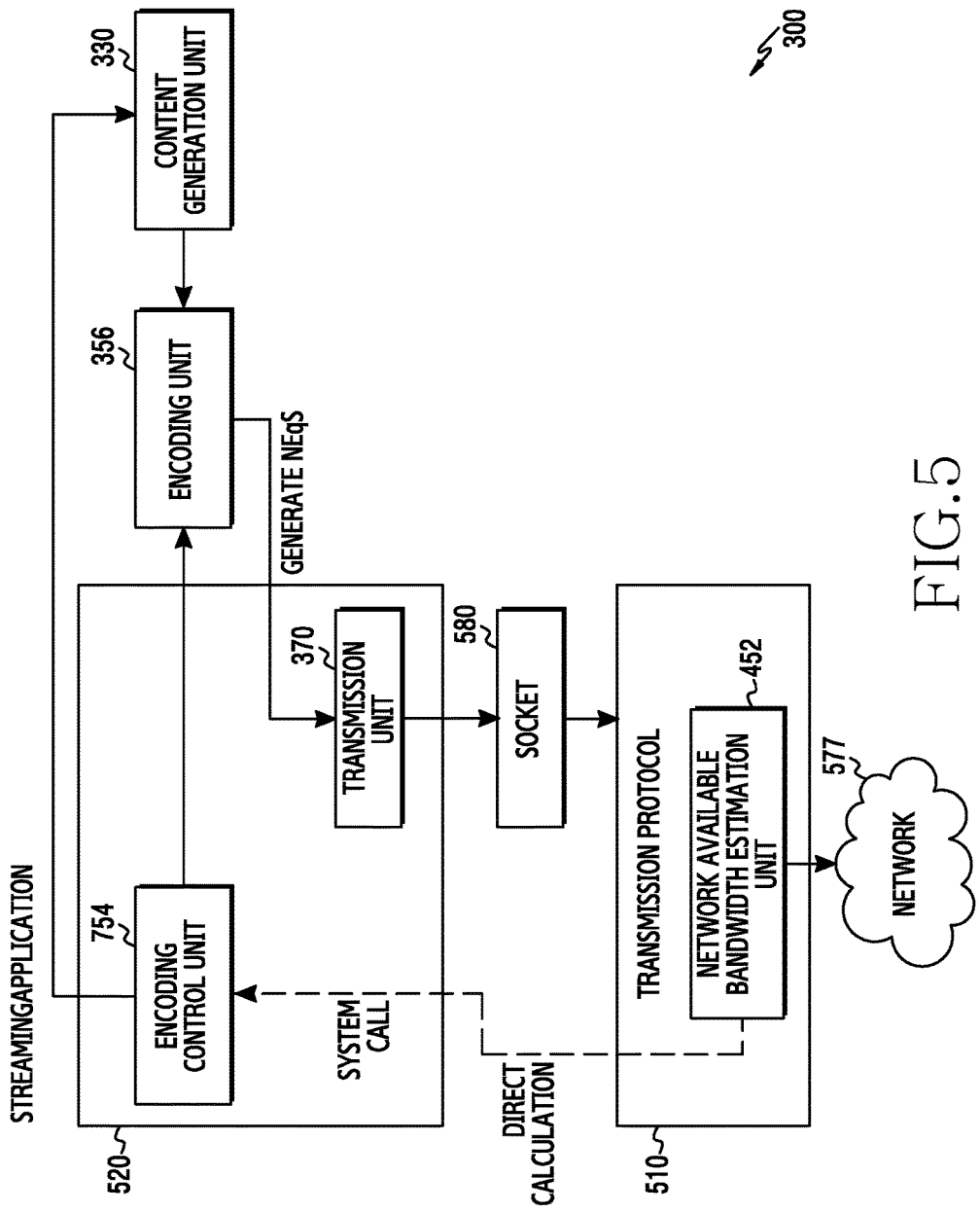
FIG. 5 illustrates a configuration of an electronic device according to various embodiments.

FIG. 5 illustrates a configuration of an electronic device according to various embodiments.

Referring to FIG. 5, the electronic device 300 may include a transmission protocol 510 and an application 520. The transmission protocol 510 may correspond to a transmission layer. The application 520 may corresponds to an application layer. The electronic device 300 may include a content generation unit 330, a network available bandwidth estimation unit 452, an encoding control unit 454, an encoding unit 456, a transmission unit 370, and a socket 580. The electronic device 300 may encode a content generated by the content generation unit 330. The electronic device 300 may encode a content stored in a memory. In some embodiments, the content generation unit 330 may have hardware separate from the electronic device 300.

The network available bandwidth estimation unit 452 may estimate a network available bandwidth value using a data flow in the transmission protocol 510. The encoding control unit 454 may receive, from the transmission protocol 510, the network available bandwidth value in the application 520.

The encoding control unit 454 may receive the network available bandwidth value using the application 820. The encoding control unit 454 may calculate a new network speed based on the estimated network available bandwidth. The encoding control unit 454 may calculate an encoding rate corresponding to the network speed, in the application layer. The encoding control unit 454 may transmit the calculated encoding rate to the encoding unit 456. The encoding unit 456 may encode initial data based on the encoding rate.

The electronic device 300 may generate stream data by encoding the initial data. The transmission unit 370 may receive the stream data. The transmission unit 370 may transmit the stream data to another device through the socket 580, the transmission protocol 510, and a network 577.

In some embodiments, the encoding control unit 454 may be included in a transmission layer as well as an application layer. For example, the encoding control unit 454 may be included in the transmission protocol 810. The encoding control unit 454 may receive a network available bandwidth from the transmission protocol. The encoding control unit 454 may transmit the network available bandwidth to the application 820 of the application layer.

The encoding control unit 454 may transmit an encoding rate to be calculated to the content generation unit 330. The content generation unit 330 may generate a content based on the encoding rate. For example, when the encoding rate is high, the content generation unit 330 may generate a content by decreasing the quality of the content. When the quality of the content decreases, the encoding unit 456 may have reduced encoding calculations. The encoding unit 456 may encode initial data during a less latency time, through a few calculations.

The electronic device 300 may utilize the maximum of a network available bandwidth in comparison with a device supporting a conventional stream technique. For example, when a network available bandwidth estimated by the device is ten, the device may determine the network available bandwidth to be two in order to provide a stable streaming service. The device configures an encoding rate based on the network available bandwidth, and transmits data. However, assuming that the network available bandwidth is eight, the electronic device 300 may configure an encoding rate and transmit data. The electronic device 300 may estimate the network available bandwidth more accurately. Since the electronic device 300 accurately estimate the network available bandwidth, a scale-down may not occur in order to provide a stable service. The electronic device 300 may cope with even a case where a network situation is very poor.

Figure 6:
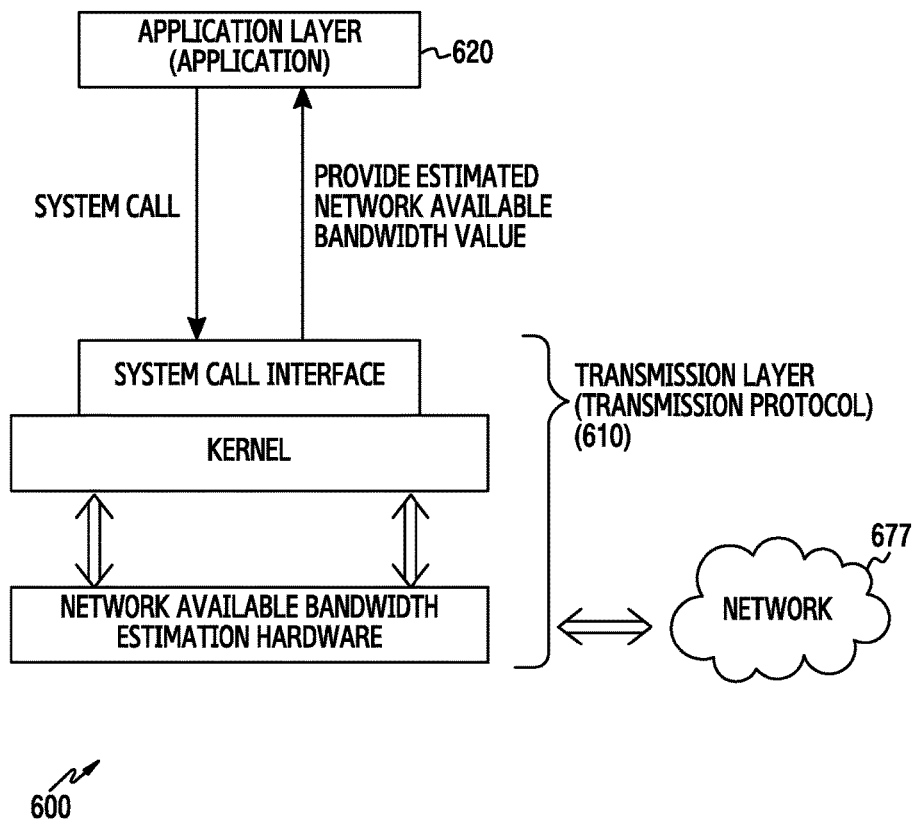
FIG. 6 illustrates a control device according to various embodiments.

FIG. 6 illustrates a control device according to various embodiments. A control device 600 may be included in the electronic device 300. The control device 600 may perform an operation for providing a network available bandwidth value from a transmission layer of the electronic device 300 to an application layer of the electronic device 300.

FIG. 6 illustrates a logical protocol structure of the electronic device 300, and the protocol structure of the electronic device 300 may include a transmission layer 610 and an application layer 620. The transmission layer 610 may correspond to the transmission protocol 510 in FIG. 5, and the application layer 620 may correspond to the application 520 in FIG. 5. The control device 600 may communicate with a network 677 in the transmission layer 610. The control device 600 may estimate a network available bandwidth value in the transmission layer 610 through the network 677.

The transmission protocol in the transmission layer 610 may be implemented in a kernel. The kernel may be a Linux kernel. The kernel may control hardware for estimating a network available bandwidth value. The kernel may perform a function for controlling the hardware, instead of an application executed in the application layer 620. The application may be an application program that requests the network available bandwidth value estimated by the hardware. The application may be an application program for accessing the kernel. That is, the application may be an application program for executing a system call.

The kernel may include a plurality of system calls. The kernel may include a system call interface including the plurality of system calls. The system call interface may include a system call table. The plurality of system calls may have respective unique numbers. The system call table may store the unique numbers of the plurality of system calls, respectively. In general, a system call interface may not include a system call for receiving a network available bandwidth value. However, according to an embodiment, a manager, user, or service provider (hereinafter, a manager) of the control device 600 may predefine a system call for receiving the network available bandwidth value. The manager may receive a unique number of the system call allocated thereto, in order to predefine the system call for providing a new service to the kernel. The manager may store the unique number in the system call table. The manager may register the number of the system call in the system call table. The manager may implement a function of the system call so as to compile the same to the kernel. That is, the manager may update the system call interface in advance.

The control device 600 may receive the network available bandwidth from the transmission layer 610, in the application layer 620. In comparison with a conventional streaming scheme, since buffer in a socket is not considered, the control device 600 may acquire the network available bandwidth value in which an unnecessary latency time is not applied. The control device 600 may use a system call in the application layer 620. The control device 600 may receive the network available bandwidth value estimated in the transmission protocol. The control device 600 may access the transmission protocol when the system call is used. In order to use the system call, the control device 600 may modify and recompile the kernel.

The control device 600 may execute the system call through the application. In response to the system call, the kernel may perform a command with reference to a unique number corresponding to the specific system call. The electronic device 300 may receive the network available bandwidth value from the kernel through the control device 600.

Figure 7:
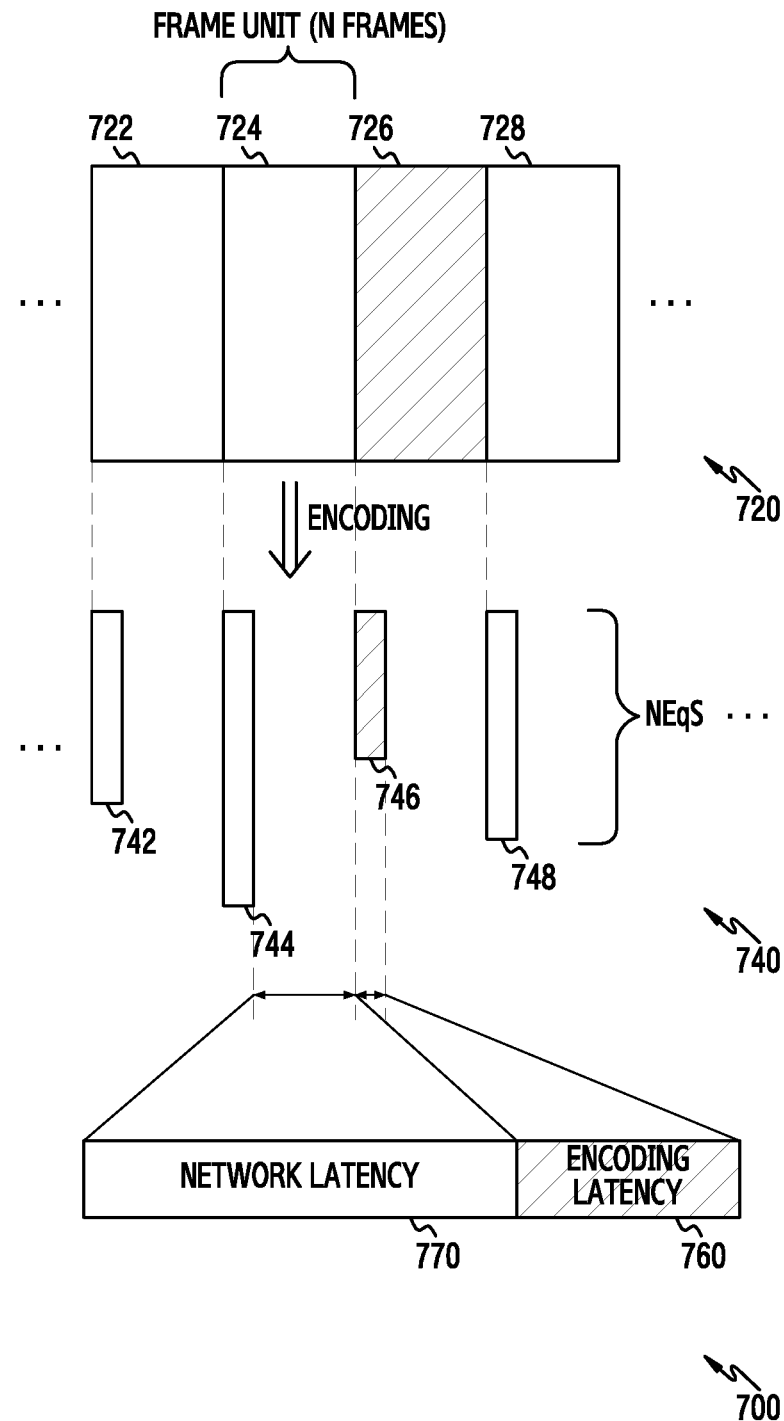
FIG. 7 illustrates a Network-aware Equal-time Stream (NEqS) according to various embodiments.
Figure 8:
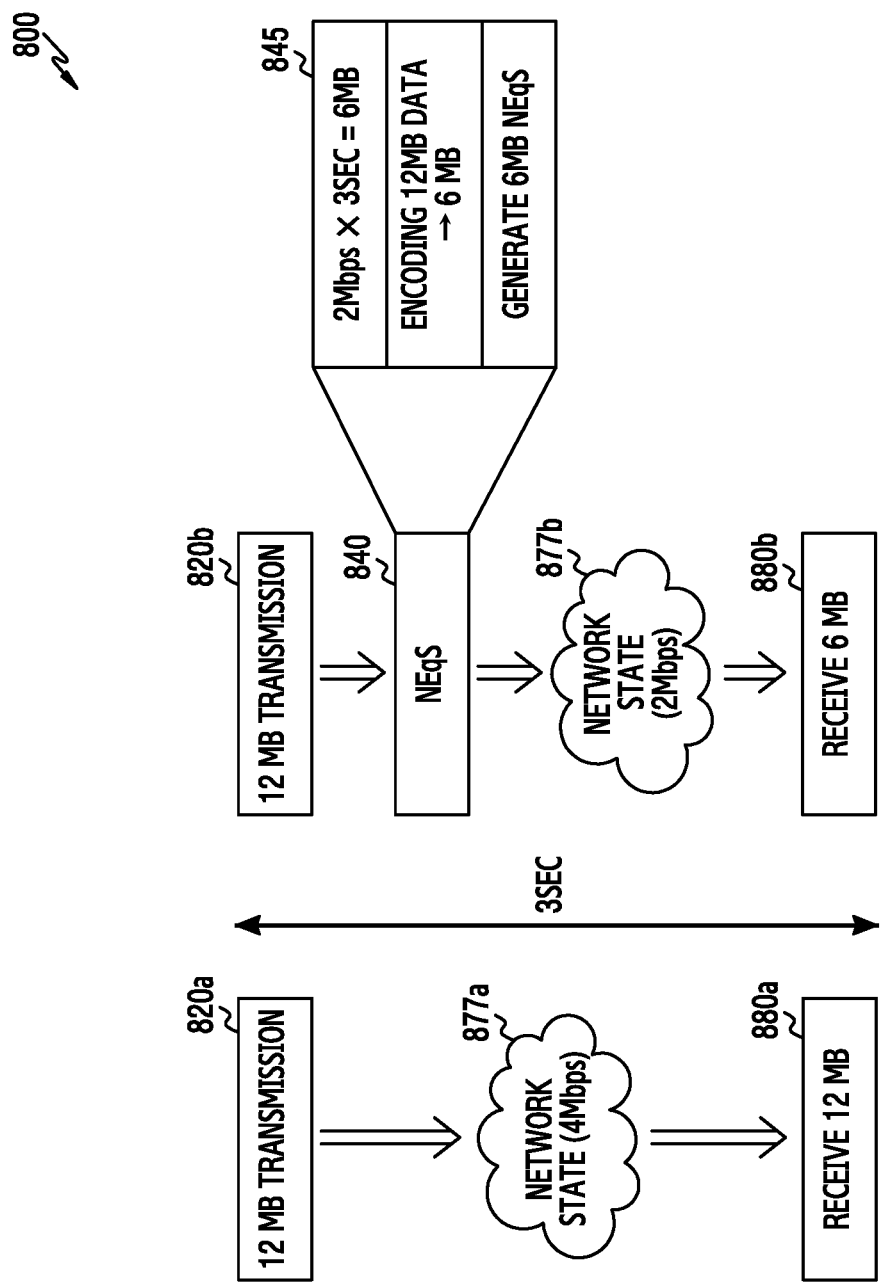
FIGS. 8A and 8B illustrates an example of application of an NEqS according to various embodiments.

FIG. 7 illustrates a Network-aware Equal-Time Stream (NEqS) according to various embodiments. The NEqS may be generated in the control unit 350 in FIG. 3. The control unit 350 may distinguish initial data into N frames. Encoding may always be performed in units of N frames. The N may be a natural number. The control unit 350 may determine the N frames based on a GOP structure having an I-frame and a P frame. The N frames may be referred to as a Network-aware Equal-Time Stream (NEqS). The NEqS may be stream data for N frames captured at equal intervals. The interval may be time. The NEqS may be data that guarantees a reproduction time corresponding to the N frames. The control unit 350 may transmit the NEqS to another device within a specific time.

Referring to FIG. 7, frame units 1020 may include N frames. The N frames may be referred to as a frame unit. The frame units 720 may include frame unit 722, frame unit 724, frame unit 726, and frame unit 728. The control unit 350 may generate stream data 740 from the frame units 720 through encoding. The stream data 740 may include NEqS 742, NEqS 744, NEqS 746, and NEqS 748. NEqS 742 may correspond to frame unit 722, NEqS 744 correspond to frame unit 724, NEqS 746 correspond to frame unit 726, and NEqS 748 correspond to frame unit 728. The NEqSs all have N frames, but may have different data sizes (e.g., mega byte, MB). That is, vertical axes of the NEqSs may be different from each other. The different vertical axes of the NEqSs may indicate different data sizes. Having different data sizes of the NEqSs may mean that each of the NEqSs have different quality and capacity. When the quality of the stream data corresponding to the NEqS needs be particularly high or particularly low, the control unit 350 may transmit a command to the content generation unit to instruct to increase or decrease the quality of the capture. In response to the instruction, the control unit 350 may previously block inefficiencies for encoding time and encoding rate, which may occur when high quality data is encoded at a low quality or vice versa.

A horizontal axis of each of the stream units may correspond to encoding latency of each of the stream units. The horizontal axis of stream unit 746 may correspond to encoding latency 760. Intervals between the stream units may correspond to network latency. The interval between stream unit 744 and stream unit 746 may correspond to network latency 770. A sum of the network latency and the encoding latency may be an allowed time.

According to various embodiments of the present disclosure, the control unit 350 may determine the allowed time based on the network available bandwidth. As the network available bandwidth is more accurately estimated, calculation of the allowed time may be more efficient. The electronic device 300 including the control unit 350 may determine the allowed time. The allowed time may be time between a time point when the electronic device 300 determines to transmit specific data to another electronic device and a time point when another electronic device receives the NEqS corresponding to the data. The electronic device 300 may start encoding at a time point determined to transmit data corresponding to the NEqS to another electronic device. The electronic device 300 may transmit the NEqS to another electronic device from a time point when the encoding is completed. A time between the time point when the transmission of specific data is determined and the time point when the encoding is completed may correspond to encoding latency, and a time between the time point when the encoding is completed and the time point when another electronic device receives the NEqS may correspond to network latency. Due to having the same number of N frames, reproduction times in the electronic device 300 and another electronic device may be the same.

FIGS. 8A and 8B illustrates an example of application of an NEqS according to various embodiments. The control unit 350 in FIG. 3 may generate and transmit the NEqS.

Referring to FIG. 8A, data 820A may have a size of 12 MB. Network state 877A may have a transmission rate of 4 Mbps. When an allowed time is assumed to be three seconds, data 820A may be transmitted without a special compression procedure. Therefore, a reception side may receive data 880A having a size of 12 MB.

Referring to FIG. 8B, data 820B may have a size of 12 MB. Network status 877B may have a transmission rate of 2 Mbps. When an allowed time is assumed to be three seconds that is the same as that in FIG. 8A, the data 820B may need a compression procedure. NEqS 840 may be generated through the compression procedure of the data 820A. The NEqS may be generated in the same order as that of step 845. First, the control unit 350 may multiply a transmission rate by an allowed time, so as to determine the size of data required to be generated. Second, the control unit 350 may encode data 820B to the same size as that of the data required to be generated. Through the encoding, the control unit 350 may generate an NEqS.

Referring to FIG. 8A and FIG. 8B, although a network state has the variation range of 2 Mbps to 4 Mbps during a fixed allowed time of 3 seconds, the control unit 350 may transmit stream data to another electronic device during the same time period. Therefore, another electronic device may receive a service during the allowed time regardless of a change in the network state. The control unit 350 may provide a low-jitter service by introducing the NEqS so as to guarantee a fixed service providing time to another electronic device. A jitter may mean a variation in ranges of a processing time, an arrival time of an output, and so on. Since a jitter hardly exists, the control unit 350 may eliminate a problem of streaming quality degradation, such as skipping. In addition, a latency time caused by unexpected scheduling may be reduced by fixing the allowed time.

Figure 9:
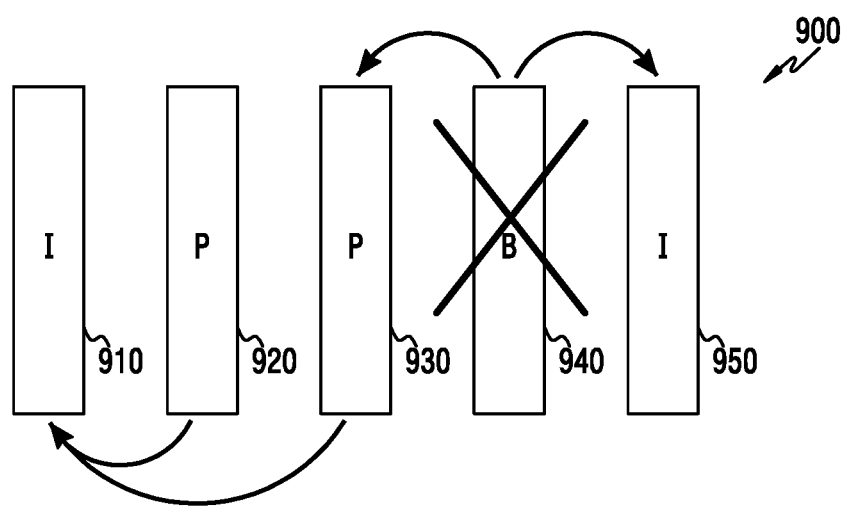
FIG. 9 illustrates a frame unit according to various embodiments.

FIG. 9 illustrates a frame unit according to various embodiments.

Moving Picture Expert Group (MPEG) defines standards for frames. According to the above standards, a general GOP structure may include the frames. The general GOP structure may include an I-frame having an image of itself, a P-frame referring to an I-frame in the preceding direction, and a B-frame referring to frames in both preceding and following directions.

Referring FIG. 9, frame unit 900 may display a GOP structure according to various embodiments of the present disclosure. Frame unit 900 may include I-frame 910, P-frame 920, P-frame 930, and I-frame 950. Frame unit 900 may not have a B-frame. When frame unit 900 has B-frame 940, since B-frame 940 refers to both directions, an encoding time may be delayed. In addition, since B-frame 940 refers to both directions, buffer of an electronic device of a reception end may not decode B-frame 940 before I-frame 950 is received. An additional latency time may occur in order to decode B-frame 940. Therefore, an electronic device according to various embodiments may not use a B-frame.

Figure 10:
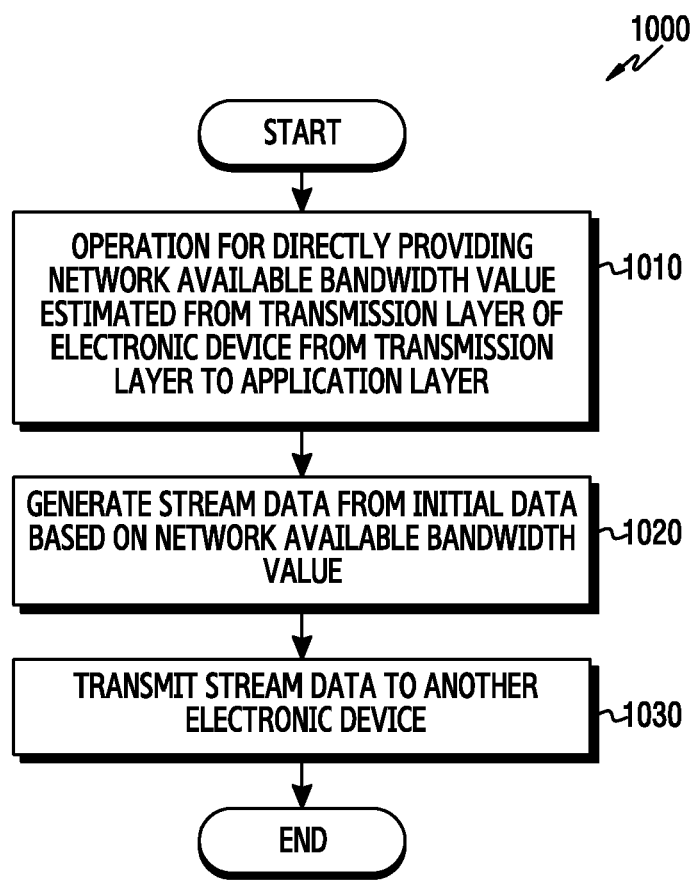
FIG. 10 is a flow diagram illustrating an operation of an electronic device according to various embodiments.

FIG. 10 is a flow diagram illustrating an operation of an electronic device according to various embodiments. The electronic device may be the electronic device 300 in FIG. 3.

Referring to FIG. 10, in step 1010, the electronic device 300 may provide a network available bandwidth value estimated in a transmission layer of the electronic device 300 from the transmission layer to an application layer of the electronic device 300. The application layer may include an application. The transmission layer may include a transmission protocol. The transmission protocol may be a TCP or a UDP. The transmission protocol may provide the estimated network available bandwidth to the application program by executing an application in the electronic device 300. Since a network speed is measured in the transmission layer to estimate the network available bandwidth, the network available bandwidth may be more accurately estimated compared to a conventional technique that performs estimation using buffer of a socket. When the network available bandwidth is accurately estimated, the maximum use thereof may be available, so that it is advantageous in the aspect of bandwidth efficiency.

In step 1020, the electronic device 300 may generate stream data from initial data based on the network available bandwidth value in the application layer of the electronic device 300. The electronic device 300 may calculate an encoding rate based on the network available bandwidth value. In a streaming service, it may be important to seamlessly provide a service to a reception device, by adjusting an encoding rate. When the network available bandwidth value is estimated to be relatively small, the electronic device 300 may configure the encoding rate to be relatively high in order to provide a stable service. On the other hand, when the network available bandwidth value is estimated to be relatively large, the electronic device 300 may configure the encoding rate to be relatively low for a high transmission rate. When the encoding rate is configured to be relatively high, the electronic device 300 may not be able to sufficiently utilize the estimated network available bandwidth.

The electronic device 300 may encode the initial data based on the calculated encoding rate and generate stream data. Through the encoding, the initial data may be changed into the stream data appropriate for a streaming service. When the size of the initial data is large and the size of the stream data needs to be small, the electronic device 300 may have encoding latency. Time for the encoding latency may be determined by performance of a CPU or GPU of an encoder.

In step 1030, the electronic device 300 may transmit the stream data to another electronic device. The electronic device 300 may transmit stream data to another device in order to provide a streaming service. It may be general for the electronic device 300 to perform transmission in units of packets. The electronic device 300 may transmit the stream data to another device through a wired or wireless network environment. The electronic device 300 may provide a stream service having less network latency to another device. The electronic device 300 may provide the stream data to another electronic device through a low-latency stream service, based on the accurately estimated network available bandwidth value.

Figure 11:
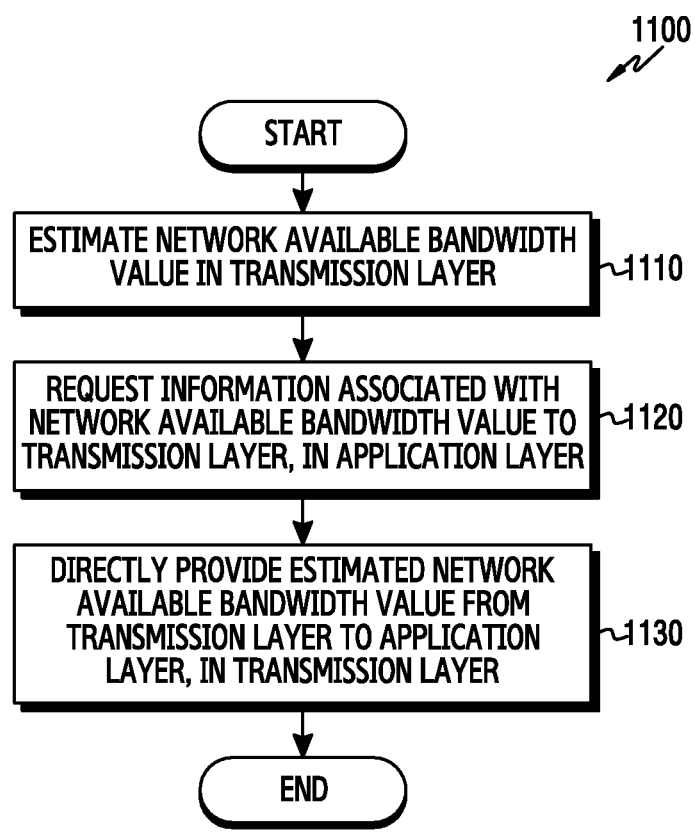
FIG. 11 is a flow diagram illustrating an operation of a control unit according to various embodiments.

FIG. 11 is a flow diagram illustrating an operation of a control unit according to various embodiments. The control unit may include the control unit 350 in FIG. 3.

Referring to FIG. 11, in step 1110, the electronic device 300 may estimate a network available bandwidth value in a transmission layer of the electronic device 300. Estimating the network available bandwidth value may correspond to measuring a network speed. Referring to [EQUATION 1], the network speed may be proportional to the network available bandwidth. According to various embodiments, the electronic device 300 may estimate or measure the network available bandwidth value, that is, the network speed, based on a round-trip time of a packet and the amount of the packets, or the round-trip time of the packet and the size of congestion window. The electronic device 300 may include hardware. The hardware may be inside the electronic device 300. The hardware may be connected with the electronic device 300. The hardware may estimate the network available bandwidth value. The hardware may be connected with the electronic device 300 through a kernel.

In step 1120, in an application layer of the electronic device 300, the electronic device 300 may request information associated with the network available bandwidth to the transmission layer of the electronic device 300. The electronic device 300 may transmit a command for estimating the network available bandwidth value to the transmission layer, in the application layer. The electronic device 300 may transmit, in the application layer, the command to the kernel, and may transmit, in the kernel, the command to the hardware. When there is a request of the application layer, the kernel may provide the estimated network available bandwidth value to the application layer. The kernel may be connected with the hardware, in the transmission layer.

The application layer may include an application. The application may be an application for providing a streaming service. The application may predefine a system call function. The system call may be the request. A system call interface that provides the system call is included in the kernel. The kernel may include the system call interface. The system call interface may include a system call table. When the application requests to execute a system call of a specific number, the kernel may refer to the system call table. The kernel may refer to the system call table so as to perform a system call service corresponding to the specific number.

In step 1130, the electronic device 300 may provide the network available bandwidth value estimated in the transmission layer of the electronic device 300, from the transmission layer to the application layer. That is, the network available bandwidth value estimated in the transmission protocol may be provided to the application by the system call. Since buffer latency is not considered, the electronic device 300 may measure a value close to an actual transmission rate.

The electronic device 300 may make the maximum use of the estimated network available bandwidth value by measuring a value close to an actual transmission rate. The electronic device 300 may reduce latency of a transmission time in the network, by utilizing the network available bandwidth value.

Figure 12:
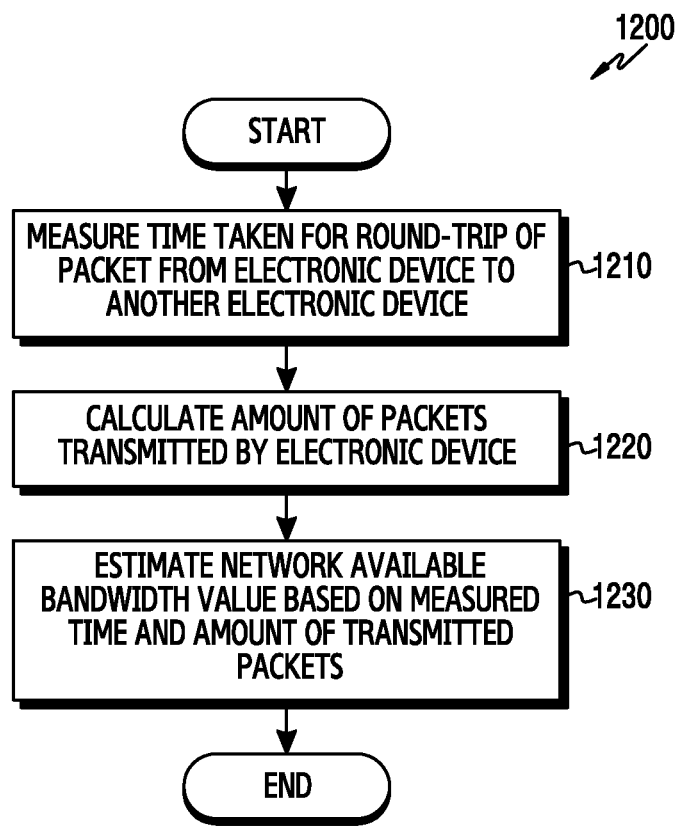
FIG. 12 is a flow diagram illustrating an operation for estimating a network available bandwidth value according to various embodiments.

FIG. 12 is a flow diagram illustrating an operation for estimating a network available bandwidth value according to various embodiments. The electronic device 300 in FIG. 3 may perform the operation.

In step 1210, the electronic device 300 may measure time taken for a round-trip of a packet from the electronic device 300 to another electronic device. The time may be a round-trip time (RTT). The time may be an interval between a time point when the electronic device 300 transmits the packet and a time point when the electronic device 300 receives acknowledgement (ACK) for the packet from another electronic device. That is, the time may indicate interactive latency. Data mentioned in the present specification may be available in units of packets.

In step 1220, the electronic device 300 may calculate the amount of packets transmitted from the electronic device 300. The electronic device 300 may calculate the total amount of packets output from the electronic device 300 during the time. The total amount of packets may be expressed in the size of data (e.g., GB, MB, KB, etc.).

In step 1230, the electronic device 300 may estimate a network available bandwidth based on the measured time and the amount of packets to be transmitted. When the calculated total amount of packets is divided by the time, the outcome may be the amount of packets to be transmitted per unit time. The amount of packets to be transmitted per unit time may mean a transmission rate on a network. When packet loss is present, an algorithm for eliminating the packet loss may be required. The algorithm may be determined according to a type of a protocol of the electronic device 300. The algorithm may be an algorithm using a scheme in which retransmission is performed by detecting whether ACK is received, an algorithm using a scheme in which retransmission is performed using a timer, and so on.

Figure 13:
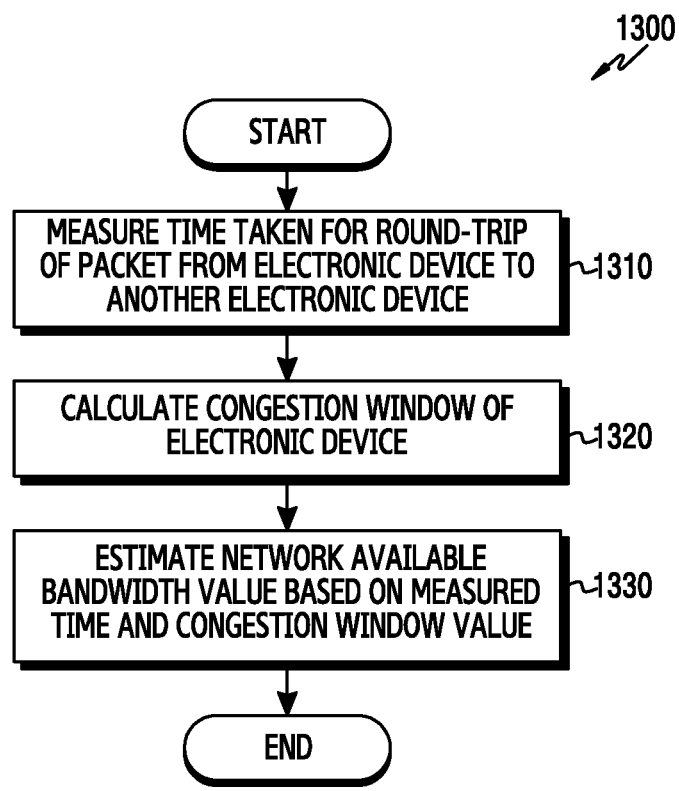
FIG. 13 is a flow diagram illustrating another operation for estimating a network available bandwidth value according to various embodiments.

FIG. 13 is a flow diagram illustrating another operation for estimating a network available bandwidth value according to various embodiments. The electronic device 300 in FIG. 3 may perform the operation.

In step 1310, the electronic device 300 may measure time taken for a round-trip of a packet from the electronic device 300 to another electronic device. The time may be a round-trip time (RTT). Step 1310 may be the same or operates in the similar manner as step 1210 in FIG. 12. That is, the electronic device 300 may acquire the time value by measuring the round-trip time of the packet.

In step 1320, the electronic device 300 may calculate a value of a congestion window of the electronic device 300. The congestion window may mean a window used in a congestion control algorithm when a congestion control is performed in transmission control protocols (TCPs). There may be a slight difference between operation schemes according to types of TCPs. The TCPs may include TCP RENO, TCP TAHOE, and TCP NEW RENO. The electronic device 300 may increase, one by one, the size of a packet provided from a transmission side to a reception side, so as to determine a time point of network saturation. The electronic device 300 may increase the size of the packet by two times, so as to determine a time point of network saturation. When another protocol such as a UDP is used, the electronic device 300 may estimate a network speed with reference to a congestion control algorithm and a mathematical expression that are used in a corresponding protocol.

In step 1330, the electronic device 300 may estimate a network available bandwidth based on the measured time and the value of the congestion window. Step 1330 may correspond to step 1230 in FIG. 12. The electronic device 300 may acquire the network speed by dividing the size of the value of the congestion window, i.e., the size of the amount of packets causing network saturation, by the measured time.

Figure 14:
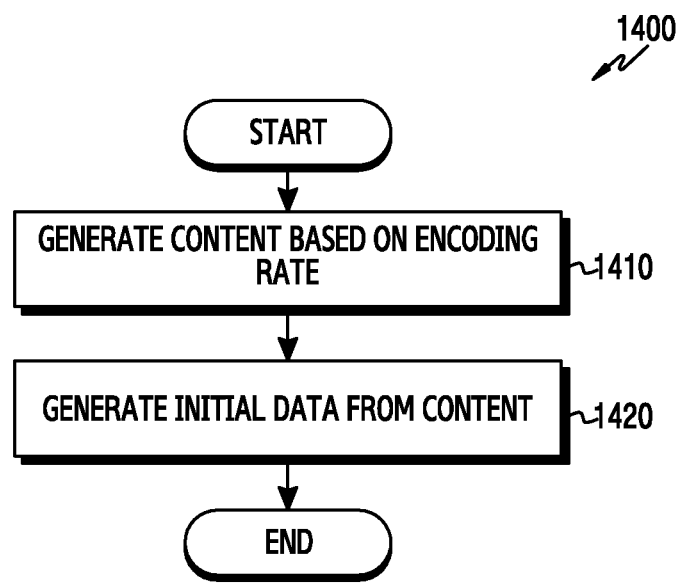
FIG. 14 is a flow diagram illustrating an operation for generating initial data according to various embodiments.

FIG. 14 is a flow diagram illustrating an operation for generating initial data according to various embodiments. The electronic device 300 in FIG. 3 may perform the operation.

In step 1410, the content generation unit 330 in FIG. 3 may generate a content based on an encoding rate. The content generation unit 330 may be included inside the electronic device 300, or may be connected with the electronic device 300 as independent hardware. The content generation unit may be a camera, a voice recorder, and a camcorder. The content generation unit may also be a device capable of storing smell or touch. The content may include various contents such as a multimedia image, a voice image, etc., in addition to a visual image. When the content generation unit photographs an image of super high quality to generate content, the electronic device 300 may apply an encoding rate of a significant compression rate when an estimated network available bandwidth is small. Since latency by the encoding rate may be relatively long, the electronic device 300 may provide an encoding rate to the content generation unit 330. The content generation unit 330 may generate content based on the encoding rate. For example, when a network available bandwidth is small, the content generation unit 330 may generate content to have a small capacity when initial data is generated. That is, the content may be actively generated according to a network situation.

In step 1420, the electronic device 300 may generate initial data from the generated content. The initial data may be raw data obtained by converting the generated content into a digital file. The electronic device 300 may generate stream data by encoding the initial data. Since the encoding rate is applied to the raw data, the electronic device 300 may reduce an encoding time.

Figure 15:
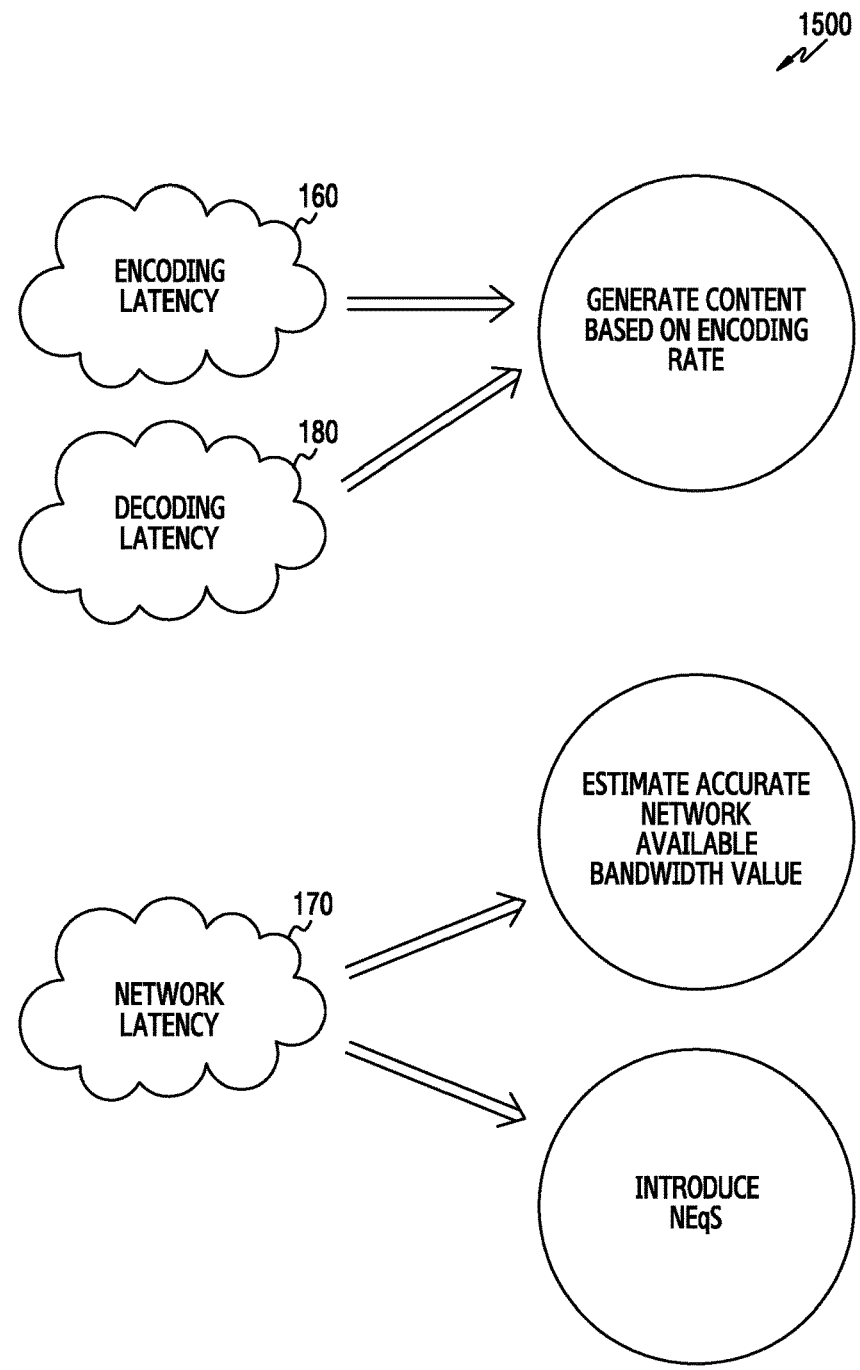
FIG. 15 illustrates an effect of a streaming system according to various embodiments.

FIG. 15 illustrates an effect of a streaming system according to various embodiments.

An electronic device according to various embodiments of the present disclosure may reduce latency occurring in a procedure for providing a streaming content. The electronic device may be the electronic device 300 in FIG. 3, or a reception device that receives a service from the electronic device 300. The present disclosure may provide an ultra low-latency service by reducing the encoding latency 160, network latency 170, and decoding latency 180 mentioned in FIG. 1.

Referring to FIG. 15, the electronic device may transmit an encoding rate to the content generation unit so as to reduce the encoding latency 160. As described above, the content generation unit may generate a content based on the encoding rate. The electronic device may encode the initial data generated from the content. Since the initial data is generated based on the encoding rate, the electronic device may reduce encoding latency. The electronic device may determine the encoding rate based on an estimated network available bandwidth value.

The encoding latency 160 or the decoding latency 180 may be changed by performance of hardware. The hardware may mean a CPU or a GPU. As described above, in a case of a multimedia encoding procedure, calculation adopts only some pixels or a combination of some pixels rather than complicated calculation, so that the electronic device may be able to perform a process using a GPU. In some embodiments, the electronic device may perform encoding and decoding using a GPU. The electronic device may reduce encoding and decoding times by using a GPU. Since a GPU has as few as several times more cores and as many as hundreds of times more cores compared to a CPU, a number of logic calculations may be concurrently processed. Therefore, when the electronic device performs encoding/decoding, it may it may be advantageous to use a GPU in consideration of cost and spatial aspects. In some other embodiments, the electronic device may perform encoding and decoding using a GPU and a CPU. In a case where some complicated calculations are required, the electronic device may reduce a latency time consumed for the encoding and decoding, by using not only a GPU alone but also using a CPU together with the GPU.

A server may have difficulty in controlling a network state between the server and a terminal, but may control network latency 170. In a conventional streaming technique, a server has transmitted data using only a bandwidth that is considerably narrower than an estimated network available bandwidth. Since the technique is unable to accurately estimate a network available bandwidth and cope with an unstable network situation in real time, the server has provided a service using a narrow bandwidth for providing a stable service to the terminal. However, an electronic device according to various embodiments of the present disclosure may estimate an accurate network available bandwidth value of the network, so as to calculate an encoding rate in consideration of an actual network situation. In addition, the electronic device (e.g., a server) may efficiently determine an allowed time allocated to an NEqS, by accurately estimating the network available bandwidth value.

The electronic device may generate stream data to have a size transmittable within the allowed time. For example, when the allowed time is 10 ms and the current network state is 10 Mbps-100 Mbps, the electronic device may generate the stream data to have a size of 0.1 MB-1 MB. The stream data may be an NEqS. The electronic device may encode the initial data to a size transmittable within the allowed time so as to generate the NEqS.

By introducing the NEqS to a streaming system according to the present disclosure, the server may provide a stable service to the terminal, and provide a low-latency service, as described above. In addition, since a service is provided in units of a fixed number of frames, the terminal may increase predictability of data reception, that is, the server may provide a low-jitter service to the terminal.

An operation method of an electronic device for providing a streaming service according to various embodiments may include: providing a network available bandwidth value estimated in a transmission layer of the electronic device from the transmission layer to an application layer; generating stream data from initial data based on the network available bandwidth value; and transmitting the stream data to another electronic device.

providing the network available bandwidth value from the transmission layer to the application layer includes: estimating the network available bandwidth value, in the transmission layer; requesting information associated with the network available bandwidth value to the transmission layer, in the application layer; and providing the estimated network available bandwidth value from the transmission layer to the application layer, in the transmission layer.

The network available bandwidth value may be provided from the transmission layer to the application layer through a system call.

Estimating the network available bandwidth value may include measuring time taken for a round-trip of a packet from the electronic device to the other electronic device, calculating the amount of packets transmitted by the electronic device, and estimating the network available bandwidth value based on the measure time and the amount of the transmitted packets.

Estimating the network available bandwidth value may include measuring time taken for a round-trip of a packet from the electronic device to another electronic device, calculating a value of a congestion window of the electronic device, and estimating the network available bandwidth value based on the measured time and the value of the congestion window, wherein the congestion window is determined based on a congestion control algorithm.

Generating the stream data may include encoding the initial data to a size transmittable within an allowed time so as to generate the stream data, wherein the allowed time is determined based on the network available bandwidth value.

Generating the stream data may include: calculating an encoding rate based on the network available bandwidth value; and encoding the initial data in units of N frames so as to generate the stream data.

The units of frames may include an I-frame or a P-frame, except for a B-frame.

The operation method may further include: generating content based on an encoding rate; and generating the initial data from the content, wherein the encoding rate is calculated based on the network available bandwidth value.

An operation method of an electronic device for receiving a streaming service according to various embodiments may include: receiving stream data from another electronic device; and decoding the stream data so as to generate reproduction data, wherein the stream data is generated based on a network available bandwidth value, and the network available bandwidth value is provided from a transmission layer of another electronic device to an application layer of another electronic device, and the network available bandwidth value is estimated in the transmission layer of another electronic device.

An electronic device for providing a streaming service according to various embodiments may include: a control unit; an encoder operatively coupled with the control unit; and a transmitter operatively coupled with the control unit, wherein the control unit is configured to provide a network available bandwidth value estimated in a transmission layer of the electronic device from the transmission layer to an application layer, generate stream data from initial data based on the network available bandwidth value, and transmit the stream data to another electronic device.

The control unit may be configured to: estimate the network available bandwidth value, in the transmission layer; request information associated with the network available bandwidth value to the transmission layer, in the application layer; and provide the estimated network available bandwidth value from the transmission layer to the application layer, in the transmission layer.

The network available bandwidth value may be provided from the transmission layer to the application layer through a system call.

The control unit may be configured to measure time taken for a round-trip of a packet from the electronic device to the other electronic device, calculate the amount of packets transmitted by the electronic device, and estimate the network available bandwidth value based on the measured time and the amount of the transmitted packets.

The control unit is configured to measure time taken for a round-trip of a packet from the electronic device to another electronic device, calculate a value of a congestion window of the electronic device, and estimate the network available bandwidth value based on the measured time and the value of the congestion window, wherein the congestion window is determined based on a congestion control algorithm.

The control unit is configured to encode the initial data to a size transmittable within an allowed time so as to generate the stream data, wherein the allowed time is determined based on the network available bandwidth value.

The control unit is configured to calculate an encoding rate based on the network available bandwidth value, and encode the initial data in units of N frames so as to generate the stream data.

The units of frames include an I-frame or a P-frame, except for a B-frame.

The electronic device may further include a content generator operatively coupled with the control unit, wherein the control unit is configured to generate a content based on an encoding rate and additionally configured to generate the initial data from the content, and the encoding rate is calculated based on the network available bandwidth value.

An electronic device for receiving a streaming service according to various embodiments may include: a control unit; a decoder operatively coupled with the control unit; and a receiver operatively coupled with the control unit, wherein the control unit is configured to receive stream data from another electronic device and decode the stream data so as to generate reproduction data, the stream data is generated based on a network available bandwidth value, the network available bandwidth value is provided from a transmission layer of another electronic device to an application layer of another electronic device, and the network available bandwidth value is estimated in the transmission layer of another electronic device.

In various embodiments, the electronic device may be a portable electronic device and may be one of a smart phone, a portable terminal, a mobile phone, a mobile pad, a media player, a tablet computer, a handheld computer, and a Personal Digital Assistant (PDA). In addition, the electronic device may be a device having a combination of functions of two or more devices described above.

A storage device and a storage media are embodiments of a program including commands that implement an embodiment when executed or a machine-readable storage means suitable for storing programs. Embodiments provide a program including codes for implementing a device or a method as claimed in one of claims in the present specification, and a machine-readable storage means in which such a program is stored. Further, such programs may be electronically transmitted by a medium such as a communication signal transmitted through a wired or wireless connection, and embodiments suitably include equivalents.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a device that performs embodiments of the present disclosure.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The embodiments disclosed in the present specifications and drawings are provided merely to readily describe and to help a thorough understanding of the present disclosure but are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An operation method of an electronic device for providing a streaming service, the method comprising:
providing, from a transmission layer of the electronic device to an application layer of the electronic device, a network available bandwidth estimated in the transmission layer of the electronic device;
determining an encoding rate based on the network available bandwidth in the application layer of the electronic device;
generating stream data for the streaming service by encoding initial data according to the encoding rate; and
transmitting the stream data to another electronic device.

2. The method of claim 1, wherein providing the network available bandwidth from the transmission layer to the application layer comprises:
estimating, at the transmission layer, the network available bandwidth;
requesting, at the application layer, information associated with the network available bandwidth to the transmission layer; and
providing, at the transmission layer, the estimated network available bandwidth from the transmission layer to the application layer.

3. The method of claim 2, wherein the network available bandwidth is provided from the transmission layer to the application layer through a system call.

4. The method of claim 2, wherein estimating the network available bandwidth comprises:
measuring a time taken for a round-trip of a packet from the electronic device to the other electronic device;
calculating an amount of packets transmitted by the electronic device; and
estimating the network available bandwidth based on the measured time and the amount of the transmitted packets.

5. The method of claim 2, wherein estimating the network available bandwidth comprises:
measuring a time taken for a round-trip of a packet from the electronic device to the other electronic device;
calculating a value of a congestion window of the electronic device; and
estimating the network available bandwidth based on the measured time and the value of the congestion window,
wherein the congestion window is determined based on a congestion control algorithm.

6. The method of claim 1, wherein encoding the initial data comprises encoding the initial data to a size transmittable within an allowed time, and
wherein the allowed time is determined based on a network delay according to the network available bandwidth ad an encoding delay.

7. The method of claim 1, wherein
the initial data is encoded in units of N frames according to the encoding rate.

8. The method of claim 7, wherein the units of N frames include an intra-coded frame (I-frame) or a predicted frame (P-frame), except for a bi-predictive frame (B-frame).

9. The method of claim 1, wherein the network available bandwidth is provided to the application layer without going through a socket.

10. The method of claim 1, wherein:
the transmission layer is used for estimating the network available bandwidth based on a transmission protocol, and
the application layer is used for providing the streaming service through an application.

11. An electronic device for providing a streaming service, the electronic device comprising:
at least one transceiver; and
at least one processor operably coupled to the at least one transceiver, and configured to:

provide, from a transmission layer of the electronic device to an application layer of the electronic device, a network available bandwidth estimated in the transmission layer of the electronic device;

determine an encoding rate based on the network available bandwidth in the application layer of the electronic device;

generate stream data for the streaming service by encoding initial data according to the encoding rate; and transmit the stream data to another electronic device.

12. The electronic device of claim 11, wherein the at least one processor is further configured to:

estimate, at the transmission layer, the network available bandwidth;

request, at the application layer, information associated with the network available bandwidth to the transmission layer; and provide, at the transmission layer, the estimated network available bandwidth from the transmission layer to the application layer.

13. The electronic device of claim 12, wherein the network available bandwidth is provided from the transmission layer to the application layer through a system call.

14. The electronic device of claim 12, wherein the at least one processor is further configured to:

measure a time taken for a round-trip of a packet from the electronic device to the other electronic device;

calculate an amount of packets transmitted by the electronic device; and estimate the network available bandwidth based on the measured time and the amount of the transmitted packets.

15. The electronic device of claim 12, wherein the at least one processor is further configured to:

measure a time taken for a round-trip of a packet from the electronic device to the other electronic device;

calculate a value of a congestion window of the electronic device; and estimate the network available bandwidth based on the measured time and the value of the congestion window, wherein the congestion window is determined based on a congestion control algorithm.

16. The electronic device of claim 11, wherein the at least one processor is, in order to encode the initial data, configured to encode the initial data to a size transmittable within an allowed time, and wherein the allowed time is determined based on a network delay according to the network available bandwidth and an encoding delay.

17. The electronic device of claim 11, wherein the at least one processor is further configured to:

calculate an encoding rate based on the network available bandwidth; and generate the stream data by encoding the initial data in units of N frames according to the encoding rate.

18. The electronic device of claim 17, wherein the units of N frames include an intra-coded frame (I-frame) or a predicted frame (P-frame), except for a bi-predictive frame (B-frame).

19. An electronic device for receiving a streaming service, comprising:

a decoder operatively coupled with a controller; and a receiver operatively coupled with the controller, the controller configured to:

cause the receiver to receive stream data for the streaming service from another electronic device; and cause the decoder to generate reproduction data by decoding the stream data, wherein the stream data is generated by encoding initial data according to an encoding rate, wherein the encoding rate is determined based on a network available bandwidth in an application layer of another electronic device, and wherein the network available bandwidth is provided from a transmission layer of the other electronic device to the application layer of the another electronic device, and the network available bandwidth is estimated in the transmission layer of the other electronic device.

20. The electronic device of claim 11, wherein:

the transmission layer is used for estimating the network available bandwidth based on a transmission protocol, and the application layer is used for providing the streaming service through an application.

* * * * *